July 9, 1940.　　　　J. E. JONES　　　2,207,435
AUTOMOBILE ACCELERATOR CONTROL
Filed Dec. 9, 1937
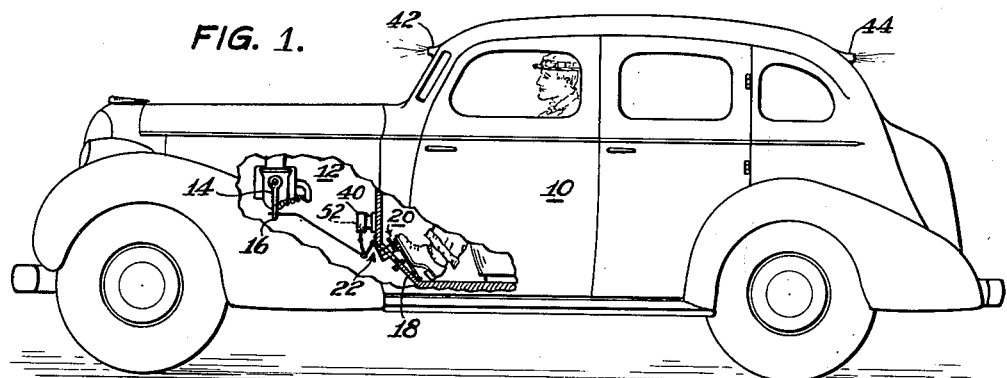
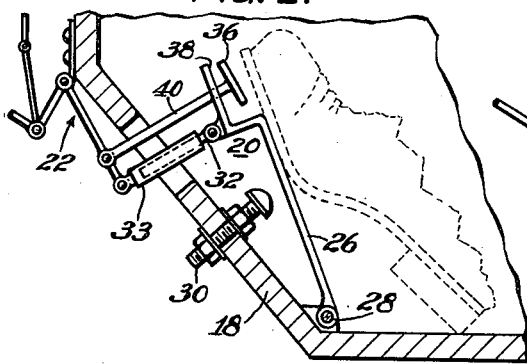
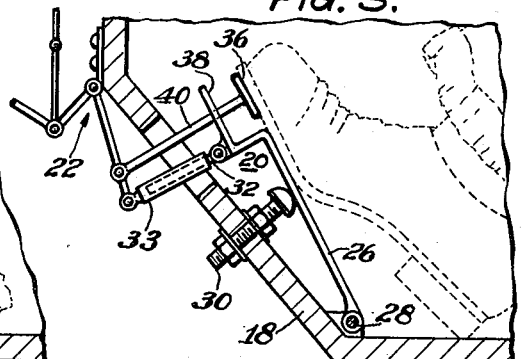
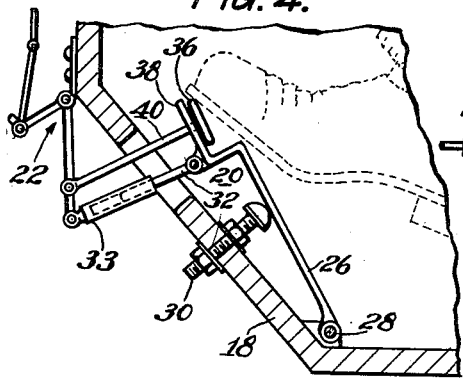
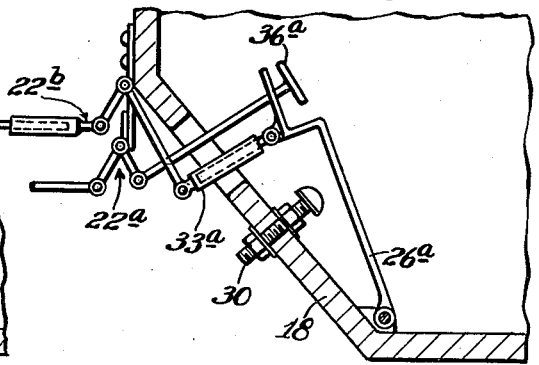
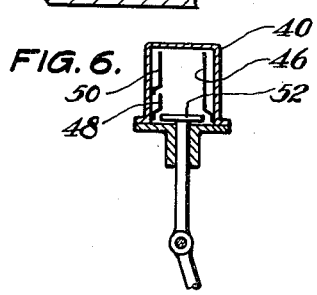
WITNESSES
INVENTOR.
John E. Jones
BY Brown, Critchlow & Flick
his ATTORNEYS.

Patented July 9, 1940

2,207,435

UNITED STATES PATENT OFFICE 2,207,435

AUTOMOBILE ACCELERATOR CONTROL

John E. Jones, West Frankfort, Ill.

Application December 9, 1937, Serial No. 178,863

6 Claims. (Cl. 74—513)

This invention relates to control mechanism for motor driven vehicles, and more particularly is concerned with apparatus for governing the speed of motor vehicles.

The large number of automobile accidents occuring yearly has caused great consternation both in the general public and in governmental agencies responsible for vehicle control. Many attempts have been made to provide more stringent laws or mechanical means for reducing the number of deaths and accidents. The inability to properly enforce laws due to insufficient personnel, and the inapplicability of the laws to all conditions, as well as the human element, have indicated that laws alone are not the solution to the existing problem. Proposed mechanical means have been unsure and expensive and have been incapable of meeting all operating conditions flexibly so that such means have never met with any appreciable public use. It is well recognized that industrial safety campaigns of a scientific and organized nature have made great progress in the last two or three decades, but few successful safety campaigns have been made either by the public or governing bodies to overcome the crying problem of vehicle deaths and accidents.

One of the greatest causes of vehicle accidents is excessive speed which is reached by a vehicle due either to the deliberate intention of the operator or due to the fact that the improved vehicles and roads cause high speeds to be reached by the vehicle operator unconsciously, and these latter operators have been found by statistics to be the most dangerous. It has been proposed to put governors on motor vehicles so that they cannot exceed a certain speed. This proposal is unsatisfactory for the reason that on many occasions it is necessary to speed up the vehicle beyond normal driving speed to avoid accidents. Any governor which the operator can readily disengage or render inoperative is also objectionable because the usual tendency is to permanently disengage it or operate the vehicle without it.

It is the general object of my invention to reduce the motor vehicle accident hazard by avoiding and overcoming the foregoing and other difficulties and objections to known mechanical control means through the provision of a safety control for operating the fuel supply valve of the motor vehicle, whereby normally the vehicle operator can comfortably and conveniently supply only sufficient fuel to the motor so that a reasonable and safe speed can be obtained, but with the safety control being so constructed and arranged that when desired the operator can readily but with further effort open the fuel valve a greater amount to obtain up to maximum speeds and acceleration.

Another object of my invention is the provision of a motor vehicle control which functions to reduce the consumption of oil and gasoline, and racing of the motor through violent acceleration.

Another and more specific object of my invention is the provision of a safety foot accelerator for motor vehicles which provides a solid balanced resting plane for the foot of the operator at the maximum of a reasonable and safe speed of the vehicle and whereby a constant fuel feed can be maintained under this condition, but which is adapted to include a secondary portion which can be depressed by the foot of the operator to open the fuel supply valve a greater amount.

Another object of my invention is the provision of a safety control of the type described for motor vehicles which includes signals placed on the vehicle so that not only the driver of the particular vehicle but also persons outside the vehicle can see from the signals the operating speed of the vehicle and act accordingly.

The foregoing and other objects of my invention are achieved by the provision of a safety control for a motor driven vehicle which comprises a valve controlling the supply of fuel to the motor, and a foot accelerator for opening the valve. The accelerator includes a main treadle portion hinged at its end nearest the operator, an adjustable stop limiting the valve opening movement of the main treadle portion, and an auxiliary treadle portion mounted at the unhinged end of the main treadle portion and operable to open the valve a greater amount. A switch is preferably associated with the accelerator mechanism, and this feature of my invention includes signal lights on the vehicle and operated by the switch to indicate the amount of opening of the valve.

For a better understanding of my invention, reference should be had to the accompanying drawing in which Fig. 1 is a schematic side elevation, partly broken away, of a motor vehicle incorporating my invention; Fig. 2 is a side elevation, partly in section, of the control mechanism shown in Fig. 1, with the mechanism being illustrated in the non-operating or closed position; Fig. 3 is similar to Fig. 2 but shows the mechanism in the partially opened governing position; Fig. 4 is like Figs. 2 and 3 but shows the mechanism in the fully open maximum speed position; Fig. 5 is a view similar to Fig. 2 but illustrates a modification of my invention; and Fig. 6 is a fragmentary cross-sectional view illustrating one type of signal switch which may be incorporated with the remaining mechanism.

While my invention is broadly applicable to motor driven vehicles of various kinds, it is particularly beneficial in conjunction with an automobile and has accordingly been so illustrated and will be so described.

Having particular reference to Fig. 1, the numeral 10 indicates generally an automobile having a motor 12 which includes a carburetor 14 having a fuel control valve operated through a crank arm 16. Mounted on the floor boards 18 of the automobile is my improved safety accelerator, indicated generally by the numeral 20, which is connected in known manner by linkage 22 with the crank arm 16 of the carburetor 14.

My improved safety accelerator includes a main treadle portion 26 which is usually pivotally secured, as at 28, to the floor boards 18 at the point thereof nearest to the operator or the operating seat of the automobile. An adjustable screw 30 or other similar means limits the downward movement of the main treadle portion 26, as will be understood. The main treadle portion 26 is pivotally secured to the linkage 22 by a link 32 which includes a slip joint 33 formed from a sleeve closed at one end and receiving the rod of the link 32. Thus, the normal movement of the main treadle portion 26 from the position shown in Fig. 2 to the position shown in Fig. 3 effects movement of the linkage 22 and valve 16 to open the fuel supply to the motor 12 a given amount dependent upon the adjustment of the screw 30. However, the slip joint 33 in the link 32 permits the linkage 22 to be moved away from the main treadle portion to fully open the valve 16 if this be desired, as it is on special occasions.

To this end, I provide an auxiliary or secondary treadle portion on the accelerator which may conveniently, as illustrated in the drawing, include a button 36 positioned at the end of the main treadle portion 26 remote from the hinge 28. The main treadle portion may be offset as at 38 to receive the secondary treadle button 36 and a rod 40 connected to the button 36 is pivotally secured at its other end to the linkage 22, as shown in Figs. 2 and 5. Normally the secondary or auxiliary treadle portion is in the same plane as the main treadle portion 26, as shown in Figs. 2 and 3. However, when the operator finds it necessary to obtain up to maximum speed from the vehicle, by opening the fuel supply valve a greater amount, the secondary treadle portion is depressed, as shown in Fig. 4, to further open the fuel supply valve by way of linkage 22.

In the operation of my control mechanism just described, the screw 30 is adjusted so that a desired safe and reasonable speed may be obtained and held by the vehicle on a level pavement, as for example from 20 to 50 miles an hour, usually about 35 miles an hour, when the main treadle portion of the accelerator is pressed down into engagement with the screw. When this is done, the main treadle portion is solidly supported on the screw and driving strain is avoided by the leg of the operator which is in engagement with the accelerator. It is a simple matter to maintain a constant supply of fuel to the motor without jiggling of the accelerator, and rough roads, hills and other conditions have no effect on maintaining the constant fuel supply. Thus, the most economical fuel feed may be established and maintained without fuel losses due to rapid or fluctuating fuel feed.

In the usual operation of the vehicle, as just described, the operator's foot on the accelerator is in a normal comfortable and easy position on the main treadle portion of the accelerator. This prevents him from unconsciously reaching an excessive speed. However, when conditions arise which necessitate up to the maximum speed of the vehicle, the operator can quickly slip his foot from the main treadle portion of the accelerator to the secondary portion to move it down to the position shown in Fig. 4 to open the fuel supply valve a greater amount. While this can be readily done, it is not particularly comfortable and unless the operator deliberately desires to maintain his maximum speed it is the normal and unconscious thing for the operator to return his foot to the main treadle portion of the accelerator once the high speed emergency has passed.

Although not essential to the operation of my improved safety control mechanism, as just described, it is an important part of my invention to provide, in combination with the control mechanism, signaling or indicating means which show the vehicle speed, or more specifically the degree of opening of the fuel supply valve. These means function as a further aid to correct vehicle operation. I particularly provide a switch box 40 in the vehicle adjacent the linkage 22 which controls the operation of signaling lamps 42 and 44 which are mounted, for example, on the front and back of the roof of the automobile so that drivers in other cars, or pedestrians, can see from the lights an indication of the speed of the automobile.

The light 42 mounted at the front of the automobile directly above the windshield has an opening in its lower portion so that the light will be visible also to the operator of the automobile. The switch 40 may include one contact 46 of spring metal of considerable length, and opposed contacts 48 and 50 of shorter length which are connected, respectively, to a green and a red bulb, for example, contained in the lamps 42 and 44. An operating plunger 52, secured through suitable linkage to the linkage 22, is moved downwardly between the contacts 46, 48 and 50 so that when the main treadle portion of the accelerator is operated, the circuit is closed between contacts 46 and 48 to light the green bulbs in the lamps 42 and 44. However, when the secondary or auxiliary portion of the accelerator is operated, the plunger 52 bridges between contacts 46 and 50 to light the red bulbs in the lamps 42 and 44, thus indicating that the automobile is operating with a fully open or substantially fully open fuel supply valve. It should be understood that I may employ mercury or other switches instead of the particular switch shown to achieve the desired function.

The modified form of accelerator illustrated in Fig. 5 is substantially identical to that shown in Figs. 1 to 4 and heretofore described, but instead of having a single linkage 22 connecting the fuel supply valve and the main and secondary portions of the accelerator, I employ a double set of linkages 22a and 22b. The linkage 22a is connected to the main treadle portion 26a of the accelerator and includes a slip joint 33a whereby the length of the linkage can be increased but not decreased. The linkage 22b is connected to the secondary portion 36b of the accelerator and to the fuel supply valve of the carburetor, so that operation of the auxiliary portion of the accelerator opens the fuel supply valve a greater amount and causes the linkage 22a to increase in length which is possible because of the slip joint 33a.

From the foregoing it will be recognized that the objects of my invention have been achieved by the provision of a relatively simple, inexpensive, and easily installed mechanism whereby in the normal and convenient operation of a motor vehicle the fuel supply valve is open to such a degree that a reasonable and safe rate of speed will be maintained. The control mechanism includes parts whereby the fuel supply valve can be opened a greater amount when desired to avoid accidents or for other purposes, and yet the operation of this part of the control mechanism is sufficiently inconvenient and unnatural to cause the operator to normally not employ it and thereby prevent excessive speeds except when deliberately desired. The signal lamps forming a part of my improved combination permit the operator of the controlled vehicle to see warning lights and also to provide signals which are readily visible to other vehicle operators or persons on foot, so that they may act accordingly. My improved mechanism is adapted to new car installation or can be used to replace the standard accelerators furnished on cars now in use.

While I have particularly described several embodiments of my invention, it should be appreciated that my invention is not limited thereto or thereby but is defined in the appended claims.

I claim:

1. A safety control for a motor driven vehicle comprising means controlling the supply of fuel to the motor, a foot accelerator, said foot accelerator including a main portion normally and comfortably engaged by the operator, an adjustable stop limiting the movement of the main portion, a secondary portion on the accelerator which can be reached and operated less easily and comfortably by the operator, linkage directly connecting the secondary portion of the accelerator with the control means whereby the control means can be fully opened, and a slip joint connecting the main portion of the accelerator and the linkage whereby the control means can be partially opened and at the same time allow the control means to be fully opened.

2. A safety control for the throttle valve of a motor vehicle comprising a foot accelerator, means connecting the foot accelerator to the valve, said foot accelerator including a main portion normally and comfortably engageable by the operator and operable through the connecting means for opening the valve a limited amount, a secondary portion on the accelerator which can be reached and operated less easily and comfortably by the operator, and means connecting the secondary portion of the accelerator with the valve and operable by the secondary portion to fully open the valve.

3. A safety control for the throttle valve of a motor vehicle comprising a foot accelerator having a main treadle portion formed with a downwardly extending offset adjacent an edge thereof, a secondary treadle portion mounted for movement from a point substantially flush with the main treadle portion to a point within the offset, linkage connecting the secondary treadle portion of the accelerator to the valve, an expansible but non-contractible slip joint connecting the main treadle portion to the linkage, and adjustable means for limiting the depressing movement of the main treadle portion.

4. A control device for the throttle valve of a motor vehicle comprising a two-part foot accelerator, linkage connecting each of the parts of the accelerator to the valve so that movement of either part moves the valve toward open position, the two parts of the accelerator being positioned fore and aft of the automobile in relation to each other and constructed and arranged so that one part is operated by the ball of the operator's foot and the other part is operated by the toe of the operator's foot, and means limiting the movement of the part engaged by the ball of the operator's foot.

5. A vehicle control device comprising primary and secondary depressible pedals positioned one in front of the other longitudinally of the vehicle for either selective or concurrent operation by slight fore and aft movement of the foot of the operator, means for limiting depression of the primary pedal, means connecting said pedals for maintaining their foot engaging surfaces in a substantially common plane throughout the range of movement of the primary pedal but permitting further depression of said secondary pedal beyond the downward limit of the primary pedal, and means common to both pedals connected for operation thereby.

6. A control device for the throttle valve of a motor vehicle comprising an accelerator pedal having operative connections to said valve, means for limiting movement of said valve by said pedal short of full open position, a second accelerator pedal positioned adjacent the first and adapted to be engaged by the operator's foot upon slight forward movement thereof, and means connecting said second accelerator pedal and said valve for effecting operation of the latter throughout its entire range.

JOHN E. JONES.